United States Patent
Yagi et al.

(10) Patent No.: US 7,709,560 B2
(45) Date of Patent: May 4, 2010

(54) RUBBER COMPOSITION FOR TIRE TREAD AND PNEUMATIC TIRE USING THE SAME

(75) Inventors: Noriko Yagi, Kobe (JP); Kiyoshige Muraoka, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 740 days.

(21) Appl. No.: 11/060,772

(22) Filed: Feb. 18, 2005

(65) Prior Publication Data

US 2005/0209390 A1     Sep. 22, 2005

(30) Foreign Application Priority Data

| Mar. 18, 2004 | (JP) | 2004-078018 |
| Mar. 23, 2004 | (JP) | 2004-084399 |
| Jun. 25, 2004 | (JP) | 2004-188467 |

(51) Int. Cl.
C09K 3/10 (2006.01)
B60C 1/00 (2006.01)
C08K 3/34 (2006.01)

(52) U.S. Cl. ................................. 523/438; 524/493
(58) Field of Classification Search ............... 523/438; 524/493
See application file for complete search history.

(56) References Cited

U.S. PATENT DOCUMENTS

| 5,462,979 | A | * | 10/1995 | Sandstrom | 523/438 |
| 5,489,628 | A | | 2/1996 | Sandstrom | |
| 6,220,323 | B1 | | 4/2001 | Sandstrom et al. | |
| 6,333,375 | B1 | * | 12/2001 | Nakamura et al. | 524/394 |
| 6,476,123 | B1 | * | 11/2002 | Morita et al. | 524/837 |
| 2001/0009932 | A1 | | 7/2001 | Garro et al. | |
| 2004/0045650 | A1 | | 3/2004 | Serra et al. | |
| 2004/0110889 | A1 | * | 6/2004 | Yagi et al. | 524/493 |

FOREIGN PATENT DOCUMENTS

| EP | 0 644 235 A1 | 3/1995 |
| EP | 0 733 673 A1 | 9/1996 |
| JP | 6-220254 A | 8/1994 |
| JP | 6-248114 A | 9/1994 |
| JP | 7-82417 A | 3/1995 |
| JP | 7-90123 A | 4/1995 |
| JP | 7-149955 A | 6/1995 |
| JP | 9-151276 A | 6/1997 |
| JP | 11-71479 A | 3/1999 |
| JP | 11-269307 A | 10/1999 |
| JP | 2001-233995 A | 8/2001 |
| JP | 2003-64222 A | 3/2003 |

* cited by examiner

*Primary Examiner*—Nathan M Nutter
(74) *Attorney, Agent, or Firm*—Birch, Stewart, Kolasch & Birch, LLP

(57) ABSTRACT

The present invention provides a rubber composition for a tire tread, in which processability, abrasion resistance, rolling resistance properties and wet grip performance are improved in a balanced manner. Specifically, the present invention provides a rubber composition for a tire tread comprising 5 to 150 parts by weight of silica having nitrogen-adsorbing specific surface area of 100 to 300 $m^2/g$ based on 100 parts of a rubber component containing 5 to 100% by weight of an epoxidized natural rubber, and 1 to 20 parts by weight of a silane coupling agent and 0.1 to 20 parts by weight of an anionic surfactant based on 100 parts by weight of the silica; and a rubber composition for a tire tread comprising 5 to 150 parts by weight of silica having nitrogen-adsorbing specific surface area of 100 to 300 $m^2/g$ and 1 to 10 parts by weight of a metal salt of stearic acid, based on 100 parts of a rubber component containing 5 to 100% by weight of an epoxidized natural rubber, and 1 to 20 parts by weight of a silane coupling agent based on 100 parts by weight of the silica.

7 Claims, No Drawings

RUBBER COMPOSITION FOR TIRE TREAD AND PNEUMATIC TIRE USING THE SAME

BACKGROUND OF THE INVENTION

The present invention relates to a rubber composition for a tire tread and a pneumatic tire using the rubber composition.

In recent years, concern is increasing regarding a rise in oil prices due to problems of supply and the exhaustion of oil resources. Also, from the viewpoint of environmental issues such as resource conservation and the tightening of regulations for the prevention of carbon dioxide exhaust, the use of natural resources is being reconsidered. The tire industry is not an exception and as an alternative material to synthetic rubber, natural rubber is attracting attention. Natural rubber has high mechanical strength and excellent abrasion resistance and therefore is frequently used for large tires such as truck and bus tires. However, because natural rubber only has methyl groups with a small molecular weight in the side chains and has a low glass transition temperature (Tg) of $-60°$ C., there is the problem that gripping performance is poor. Also, because natural rubber is a natural resource, there is the problem that ozone resistance, heat-aging resistance and weatherability are poor.

In order to solve these problems, natural rubber derivatives such as cyclized natural rubber, chlorinated natural rubber and epoxidized natural rubber are used. For example, JP-A-6-220254, JP-A-7-90123, JP-A-7-149955 and JP-A-2001-233995 suggest the method of using epoxidized natural rubber as the tire material. Herein, epoxidized natural rubber refers to natural rubber in which the unsaturated double bonds thereof are epoxidized. Epoxidized natural rubber has higher glass transition temperature (Tg) than natural rubber and is superior in mechanical strength, abrasion resistance and gas permeability, as the molecular cohesive force increases due to the epoxy groups, which are polar groups. Particularly, in rubber compositions which contain silica, silanol groups of the silica surface and epoxy groups of the epoxidized natural rubber are known to interact and as a result, mechanical strength and abrasion resistance equivalent to those obtained by a compound in which carbon black is added can be obtained.

However, although epoxidized natural rubber has a large hysteresis loss and excellent wet grip performance, there is the problem that rolling resistance increases (rolling resistance properties decrease) even when containing silica. Furthermore, because interaction between silica and epoxidized natural rubber is strong, in a blend compound of epoxidized natural rubber and other diene rubber, silica tends to be present on the epoxidized natural rubber side and as a result, there is the problem that not only does processability decrease, but also, hardness increases and abrasion resistance and heat-aging resistance decrease.

JP-A-11-71479 describes the method of compounding a specific stearic acid derivative. By using a specific stearic acid derivative as a processing aid for rubber components such as natural rubber and isoprene rubber, the rubber is softened and dispersibility of silica and other compounding agents becomes favorable. As a result, processability and abrasion resistance are improved. However, epoxidized natural rubber is not used as the rubber component in this method and processability and abrasion resistance are insufficient.

SUMMARY OF THE INVENTION

The present invention aims to provide a rubber composition for a tire tread, in which processability, abrasion resistance, rolling resistance properties and wet grip performance are improved in a balanced manner.

The first embodiment of the present invention relates to a rubber composition for a tire tread comprising 5 to 150 parts by weight of silica having nitrogen-adsorbing specific surface area of 100 to 300 $m^2/g$ based on 100 parts of a rubber component containing 5 to 100% by weight of an epoxidized natural rubber, and 1 to 20 parts by weight of a silane coupling agent and 0.1 to 20 parts by weight of an anionic surfactant based on 100 parts by weight of the silica.

The rubber composition for a tire tread preferably further comprises 1 to 50 parts by weight of a vegetable-derived oil based on 100 parts by weight of the rubber component.

The second embodiment of the present invention relates to a rubber composition for a tire tread comprising 5 to 150 parts by weight of silica having nitrogen-adsorbing specific surface area of 100 to 300 $m^2/g$ and 1 to 10 parts by weight of a metal salt of stearic acid, based on 100 parts of a rubber component containing 5 to 100% by weight of an epoxidized natural rubber, and 1 to 20 parts by weight of a silane coupling agent based on 100 parts by weight of the silica.

The metal salt of stearic acid is preferably an alkaline earth metal salt.

The present invention also relates to a pneumatic tire comprising the rubber composition for a tire tread of the first or second embodiment.

DETAILED DESCRIPTION

The rubber composition for a tire tread of the first embodiment of the present invention comprises a rubber component, silica, a silane coupling agent and an anionic surfactant.

The rubber component contains epoxidized natural rubber. As the epoxidized natural rubber, commercially available epoxidized natural rubber can be used or natural rubber can be epoxidized and then used. The method for epoxidizing natural rubber is not particularly limited and epoxidation can be conducted using methods such as the chlorohydrin method, the direct oxidization method, the hydrogen peroxide method, the alkyl hydroperoxide method and the peracid method. An example is the method of reacting natural rubber with organic peracid such as peracetic acid or performic acid.

The epoxidation degree of the epoxidized natural rubber is preferably at least 5% by mol, more preferably at least 10% by mol. When the epoxidation degree is less than 5% by mol, the modification of the rubber composition tends to be small. Also, the epoxidation degree preferably at most 80% by mol, more preferably at most 60% by mol. When the epoxidation degree is more than 80% by mol, the polymer component gelates, thus being unfavorable.

The content of the epoxidized natural rubber is at least 5% by weight, preferably at least 10% by weight in the rubber component. When the epoxidized natural rubber is less than 5% by weight, sufficient gripping performance cannot be obtained, thus being unfavorable. Also, the content of the epoxidized natural rubber is at most 100% by weight, preferably at most 95% by weight, more preferably at most 90% by weight.

Examples of the rubber component besides epoxidized natural rubber that is used in the rubber composition for a tire tread of the first embodiment are natural rubber and/or diene synthetic rubber.

Examples of the diene synthetic rubber are styrene-butadiene rubber (SBR), polybutadiene rubber (BR), polyisoprene rubber (IR), ethylene-propylene-diene rubber (EPDM), chloroprene rubber (CR), acrylonitrile-butadiene rubber (NBR), butyl rubber (IIR) and halogenated butyl rubber. These rubbers may be used alone or two or more kinds may be used together.

Examples of the silica are silica prepared by a wet method or a dry method and are not particularly limited.

The nitrogen-adsorbing specific surface area ($N_2SA$) of the silica is at least 100 $m^2/g$, preferably at least 120 $m^2/g$. When $N_2SA$ of the silica is less than 100 $m^2/g$, the reinforcing effects obtained by compounding silica are small. Also, $N_2SA$ of the silica is at most 300 $m^2/g$, preferably at most 280 $m^2/g$. When $N_2SA$ of the silica is more than 300 $m^2/g$, dispersability of silica decreases and heat generation of the rubber composition increases, thus being unfavorable.

The content of silica is at least 5 parts by weight, preferably at least 10 parts by weight, more preferably at least 15 parts by weight, based on 100 parts by weight of the rubber component. When the content of silica is less than 5 parts by weight, low heat generating properties and wet grip performance cannot sufficiently be obtained. Also, the content of silica is at most 150 parts by weight, preferably at most 120 parts by weight, more preferably at most 100 parts by weight. When the content of silica is more than 150 parts by weight, processability and workability become poor, thus being unfavorable.

The rubber composition for a tire tread of the present invention contains a silane coupling agent. The silane coupling agent that can suitably be used in the present invention is any silane coupling agent that is conventionally used together with a silica filler. Specific examples are bis (3-triethoxysilylpropyl)tetrasulfide, bis(2-triethoxysilylethyl)tetrasulfide, bis(4-triethoxysilylbutyl)tetrasulfide, bis(3-trimethoxysilylpropyl)tetrasulfide, bis(2-trimethoxysilylethyl)tetrasulfide, bis(4-trimethoxysilylbutyl)tetrasulfide, bis(3-methyldiethoxysilylpropyl)tetrasulfide, bis(2-methyldimethoxysilylethyl)tetrasulfide, bis(4-methyldimethoxysilylbutyl)tetrasulfide, bis(3-triethoxysilylpropyl)trisulfide, bis(2-triethoxysilylethyl)trisulfide, bis(4-triethoxysilylbutyl)trisulfide, bis(3-trimethoxysilylpropyl)trisulfide, bis(2-trimethoxysilylethyl)trisulfide, bis(4-trimethoxysilylbutyl)trisulfide, bis(3-triethoxysilylpropyl)disulfide, bis(2-triethoxysilylethyl)disulfide, bis(4-triethoxysilylbutyl)disulfide, bis(3-trimethoxysilylpropyl)disulfide, bis(2-trimethoxysilylethyl)disulfide, bis(4-trimethoxysilylbutyl)disulfide, bis(3-methyldiethoxysilylpropyl)disulfide, bis(2-methyldiethoxysilylpropyl)disulfide, bis(4-methyldiethoxysilylpropyl)disulfide, bis(3-methyldimethoxysilylpropyl)disulfide, bis(2-methyldimethoxysilylpropyl)disulfide, bis(4-methyldimethoxysilylbutyl)disulfide, 3-mercaptopropyltrimethoxysilane, 3-mercaptopropyltriethoxysilane, 2-mercaptoethyltrimethoxysilane, 2-mercaptotriethyltriethoxysilane, 3-aminopropyltriethoxysilane, 3-aminopropyltrimethoxysilane, 3-(2-aminoethyl)aminopropyltriethoxysilane, 3-(2-aminoethyl)aminopropyltrimethoxysilane, γ-glycidoxypropyltriethoxysilane, γ-glycidoxypropyltrimethoxysilane, γ-glycidoxypropylmethyldiethoxysilane and γ-glycidoxypropylmethyldimethoxysilane. Particularly, the silane coupling agent preferably satisfies the following formula.

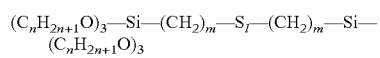

$(C_nH_{2n+1}O)_3—Si—(CH_2)_m—S_l—(CH_2)_m—Si—(C_nH_{2n+1}O)_3$

In the formula, l represents the number of sulfur atoms in the polysulfide part, n is an integer of 1 to 3, m is an integer of 1 to 4 and the average value of l is 2.1 to 3.5. When the average value of l is less than 2.1, reactivity of the silane coupling agent and the rubber component tends to become poor and when the average value is more than 3.5, gelation may be accelerated when processing.

Of the silane coupling agents that satisfy the above formula, in view of achieving both the effects of adding the coupling agent and low cost, bis(3-triethoxysilylpropyl)disulfide, bis(3-trimethoxysilylpropyl)disulfide, bis(3-methyldiethoxysilylpropyl)disulfide and bis(3-methyldimethoxysilylpropyl)disulfide are suitably used. These coupling agents may be used alone or two or more kinds may be used together.

The content of the silane coupling agent is at least 1 part by weight, preferably at least 2 parts by weight, based on 100 parts by weight of the silica. When the content of the silane coupling agent is less than 1 part by weight, the effects of adding the silane coupling agent such as improving dispersability of silica cannot sufficiently be obtained. Also, the content of the silane coupling agent is at most 20 parts by weight, preferably at most 15 parts by weight. When the content of the silane coupling agent is more than 20 parts by weight, the coupling effect cannot sufficiently be obtained although cost is high and reinforcing properties and abrasion resistance decrease, thus being unfavorable. In view of the dispersion effect and the coupling effect, the content of the silane coupling agent is preferably 2 to 15 parts by weight.

The anionic surfactant is not particularly limited and anionic surfactants that are conventionally used as dispersion agents of fillers and pigments can be used. Examples are fatty acid salts, alkyl sulfate, alkyl benzene sulfonate, alkyl naphthalene sulfonate, alkyl sulfosuccinate, alkyl diphenyl ether disulfonate, sodium 2-naphthalene sulfonate formaldehyde condensate and polycarboxylate polymer type surfactants. Of these, sodium 2-naphthalene sulfonate formaldehyde condensate and polycarboxylate polymer type surfactants are suitably used.

The content of the anionic surfactant is at least 0.1 part by weight, preferably at least 0.5 part by weight based on 100 parts by weight of the silica. When the content of the anionic surfactant is less than 0.1 part by weight, sufficient compatibility cannot be obtained. Also, the content of the anionic surfactant is at most 20 parts by weight, preferably at most 15 parts by weight. When the content of the anionic surfactant is more than 20 parts by weight, hardness and modulus decrease and reinforcing properties and abrasion resistance become poor, thus being unfavorable.

The rubber composition for a tire tread of the first embodiment of the present invention preferably contains a vegetable-derived oil as a softening agent.

Examples of the vegetable-derived oil are castor oil, cotton seed oil, linseed oil, rape seed oil, soya bean oil, palm oil, cocoanut oil, peanut oil, Japan wax, rosin, pine oil, dipentene, pine tar and tall oil.

Softening agents that are commonly used in rubber compositions for tires are mineral softening agents such as process oil, co-oligomer of ethylene and α-olefin, paraffin wax, liquid paraffin, white oil, petrolatum, petroleum sulfonate, gilsonite, petroleum asphalt and petroleum resin. However, from the viewpoint of environmental problems, vegetable softening agents are more preferable than mineral softening agents and particularly, from the viewpoint of the degree of influence to workability and properties, cotton seed oil, rape seed oil and soya bean oil are preferable.

The content of the vegetable-derived oil is preferably at least 1 part by weight, more preferably at least 5 parts by weight based on 100 parts by weight of the rubber component. When the content of the vegetable-derived oil is less than 1 part by weight, the plasticizing effect on the rubber tends to be small. Also, the content of the vegetable-derived oil is preferably at most 50 parts by weight, more preferably at most 45 parts by weight. When the content of the vegetable-derived oil is more than 50 parts by weight, compatibility decreases, processability becomes poor and bleeding of the vegetable-derived oil occurs, thus being unfavorable.

Besides the rubber component, silica, silane coupling agent, anionic surfactant and vegetable-derived oil, compounding agents that are usually used in the rubber industry, such as reinforcing agents including carbon black, antioxidants, vulcanizing agents such as sulfur, vulcanization accelerators and vulcanization accelerating aids, can be compounded to the rubber composition for a tire tread of the first embodiment of the present invention, when necessary.

The rubber composition for a tire tread of the second embodiment of the present invention comprises a rubber component, silica, a metal salt of stearic acid and a silane coupling agent. The rubber component, silica and silane coupling agent are the same as those used in the rubber composition for a tire tread of the first embodiment of the present invention.

Examples of the metal salt of stearic acid are magnesium stearate, magnesium 12-hydroxystearate, calcium stearate, calcium 12-hydroxystearate, barium stearate, barium 12-hydroxystearate, zinc stearate and zinc 12-hydroxystearate. Of these, from the viewpoints of the effect of improving heat resistance and compatibility with the epoxidized natural rubber, alkaline earth metal salts are preferable and calcium stearate, calcium 12-hydroxystearate, barium stearate and barium 12-hydroxystearate are more preferable.

The content of the metal salt of stearic acid is at least 1 part by weight, preferably at least 1.5 part by weight based on 100 parts by weight of the rubber component. When the content of the metal salt of stearic acid is less than 1 part by weight, compatibility and the effect of improving heat resistance cannot sufficiently be obtained. Also, the content of the metal salt of stearic acid is at most 10 parts by weight, preferably at most 8 parts by weight. When the content of the metal salt of stearic acid is more than 10 parts by weight, hardness and modulus decrease and abrasion resistance tends to become poor, thus being unfavorable.

Besides the rubber component, silica, silane coupling agent and metal salt of stearic acid, compounding agents that are usually used in the rubber industry, such as reinforcing agents including carbon black, softening agents such as oil, antioxidants, vulcanizing agents such as sulfur, vulcanization accelerators and vulcanization accelerating aids, can be compounded to the rubber composition for a tire tread of the second embodiment of the present invention, when necessary.

The rubber composition for a tire of the present invention preferably contains, along with the rubber component, silica and silane coupling agent, a combination of the anionic surfactant of the first embodiment and the metal salt of stearic acid of the second embodiment. By containing a combination of these components, processability, abrasion resistance, rolling resistance properties and wet grip performance can be improved in a balanced manner.

Also, when the anionic surfactant and metal salt of stearic acid are compounded together as described above to the rubber composition for a tire of the present invention, the vegetable-derived oil of the first embodiment is particularly preferably compounded as the softening agent.

The pneumatic tire of the present invention is prepared by the usual method using the rubber compositions for a tire tread of the first embodiment and the second embodiment of the present invention. That is, the rubber composition for a tire tread of the present invention to which the above additives are added when necessary is extruded into each component of a tire in an unvulcanized state and then formed into a tire by the usual method on a tire molding machine to prepare an unvulcanized tire. The unvulcanized tire is heated and pressurized in a vulcanizer to prepare a tire.

Hereinafter, the present invention is explained in detail by means of Examples, but the present invention is not limited thereto.

The various chemicals used in Examples are described below.

Natural rubber: RSS #3

Epoxidized natural rubber: ENR-50 (epoxidation ratio: 50% by mol) available from Kumplan Guthrie Berhad (Malaysia)

Styrene-butadiene rubber: SBR 1502 (amount of styrene units: 23.5% by weight) available from JSR Corporation Silica: Ultrasil VN3 ($N_2SA$: 210 $m^2/g$) available from Degussa Co.

Silane coupling agent: Si266 (bis(3-triethoxysilylpropyl)disulfide) (average value of 1:2.2) available from Degussa Co.

Aromatic oil: JOMO Process X140 available from Japan Energy Corporation

Vegetable oil: Refined Soya Bean Oil available from Nisshin Oillio, Ltd.

Anionic surfactant 1: DEMOL EP (special polycarboxylate polymer type surfactant) available from KAO CORPORATION Anionic surfactant 2: DEMOL MS (sodium arylsulfonate formaldehyde condensate) available from KAO CORPORATION Calcium stearate: GF200 available from NOF Corporation Barium stearate: Barium stearate available from Sakai Chemical Industry Co., Ltd.

Antioxidant: NO CRAC 6C (N-(1,3-dimethylbutyl)-N'-phenyl-p-phenylenediamine) available from Ouchi Shinko Chemical Industrial Co., Ltd.

Stearic acid: Stearic acid available from NOF Corporation

Zinc oxide: Zinc oxide type 1 available from Mitsui Mining and Smelting Co., Ltd.

Sulfur: Powdery sulfur available from Tsurumi Chemicals Co., Ltd.

Vulcanization accelerator TBBS: Nocceler-NS (N-t-butyl-2-benzothiazolylsulfenamide) available from Ouchi Shinko Chemical Industrial Co., Ltd.

Vulcanization accelerator DPG: Nocceler-D (1,3-diphenylguanidine) available from Ouchi Shinko Chemical Industrial Co., Ltd.

Examples 1 to 16 and Comparative Examples 1 to 7

The various chemicals were kneaded and mixed according to the compositions shown in Tables 1 to 5 to obtain each sample rubber. The compositions were press vulcanized at 160° C. for 20 minutes to obtain vulcanized articles and the following tests of properties were conducted for the articles.

<Processability Test>

The Mooney viscosity was measured at 130° C. according to the method for measuring Mooney viscosity defined in JIS K6300. The processability was represented as an index by the following formula based on the Mooney viscosity of Comparative Example 1 ($ML_{1+4}$) as 100 in Tables 1 and 5 and the Mooney viscosity of Comparative Example 4 ($ML_{1+4}$) as 100 in Tables 2 to 4. The larger the index is the lower the Mooney viscosity and the better the processability.

(Mooney viscosity index)=($ML_{1+4}$ of Com. Ex. 1 or 4)/($ML_{1+4}$ of each Composition)×100

100 in Tables 1 and 5 and the measured value of Comparative Example 4 as 100 in Tables 2 to 4. The larger the index was the better the wet grip performance was.

(Wet skid index)=(value of each Composition)/(value of Com. Ex. 1 or 4)×100

The results are respectively shown in Tables 1 to 5.

TABLE 1

|  | Ex. | | | | | | Com. Ex. | | |
| --- | --- | --- | --- | --- | --- | --- | --- | --- | --- |
|  | 1 | 2 | 3 | 4 | 5 | 6 | 1 | 2 | 3 |
| Composition (parts by weight) | | | | | | | | | |
| Natural rubber | 40 | 40 | 40 | 40 | 40 | 40 | 40 | 40 | 40 |
| Epoxidized natural rubber | 60 | 60 | 10 | 10 | 60 | 60 | — | 60 | 10 |
| Styrene butadiene rubber | — | — | 50 | 50 | — | — | 60 | — | 50 |
| Silica | 50 | 50 | 50 | 50 | 50 | 50 | 50 | 50 | 50 |
| Silane coupling agent | 5 | 5 | 5 | 5 | 5 | 5 | 5 | 5 | 5 |
| Aromatic oil | — | — | — | — | 10 | 10 | 10 | 10 | — |
| Vegetable oil | 10 | 10 | 10 | 10 | — | — | — | — | 10 |
| Anionic surfactant 1 | 1 | — | 1 | — | 1 | — | — | — | — |
| Anionic surfactant 2 | — | 1 | — | 1 | — | 1 | — | — | — |
| Antioxidant | 1 | 1 | 1 | 1 | 1 | 1 | 1 | 1 | 1 |
| Stearic acid | 2 | 2 | 2 | 2 | 2 | 2 | 2 | 2 | 2 |
| Zinc oxide | 3 | 3 | 3 | 3 | 3 | 3 | 3 | 3 | 3 |
| Sulfur | 1.5 | 1.5 | 1.5 | 1.5 | 1.5 | 1.5 | 1.5 | 1.5 | 1.5 |
| Vulcanization accelerator TBBS | 1 | 1 | 1 | 1 | 1 | 1 | 1 | 1 | 1 |
| Vulcanization accelerator DPG | 0.5 | 0.5 | 0.5 | 0.5 | 0.5 | 0.5 | 0.5 | 0.5 | 0.5 |
| Evaluation results | | | | | | | | | |
| Processability | 100 | 100 | 101 | 100 | 99 | 98 | 100 | 76 | 88 |
| Abrasion resistance | 100 | 99 | 100 | 100 | 98 | 98 | 100 | 80 | 90 |
| Rolling resistance properties | 101 | 101 | 102 | 101 | 101 | 100 | 100 | 92 | 94 |
| Wet grip performance | 106 | 104 | 102 | 101 | 105 | 104 | 100 | 106 | 101 |

<Abrasion Resistance Test>

The amount of Lambourn abrasion was measured under conditions of temperature of 20° C., slip ratio of 20% and test time of 5 minutes by a Lambourn abrasion tester and the volume loss of each composition was calculated. The abrasion resistance was represented as an index by the following formula based on the loss of Comparative Example 1 as 100 in Tables 1 and 5 and the loss of Comparative Example 4 as 100 in Tables 2 to 4. The larger the index is the better the abrasion resistance.

(Abrasion resistance index)=(loss of Com. Ex. 1 or 4)/(loss of each Composition)×100

<Rolling Resistance Test>

The tan δ of each composition was measured under conditions of temperature of 70° C., initial strain of 10% and dynamic strain of 2% using a viscoelasticity spectrometer VES (made by Iwamoto Corporation). The rolling resistance was represented as an index by the following formula based on tan δ of Comparative Example 1 as 100 in Tables 1 and 5 and tan δ of Comparative Example 4 as 100 in Tables 2 to 4. The larger the index is the more the rolling resistance is reduced and the better the rolling resistance properties.

(Rolling resistance index)=(tan δ of Com. Ex. 1 or 4)/(tan δ of each Composition)×100

<Wet Skid Test>

Skid resistance was measured according to the method of ASTM E300-83 using a portable skid tester made by The Stanley London Division of The Munro Group. The wet skid performance was represented as an index by the following based on the measured value of Comparative Example 1 as From the results of Table 1, it can be seen that by compounding an anionic surfactant, rolling resistance properties and wet grip performance are improved without decreasing processability or abrasion resistance.

TABLE 2

|  | Ex. 7 | Com. Ex. 4 |
| --- | --- | --- |
| Composition (parts by weight) | | |
| Natural rubber | — | — |
| Epoxidized natural rubber | 100 | 100 |
| Styrene butadiene rubber | — | — |
| Silica | 50 | 50 |
| Silane coupling agent | 5 | 5 |
| Calcium stearate | 5 | — |
| Barium stearate | — | — |
| Antioxidant | 1 | 1 |
| Stearic acid | 2 | 2 |
| Zinc oxide | 3 | 3 |
| Sulfur | 1.5 | 1.5 |
| Vulcanization accelerator TBBS | 1 | 1 |
| Vulcanization accelerator DPG | 0.5 | 0.5 |
| Evaluation results | | |
| Processability (Index) | 118 | 100 |
| Abrasion resistance (Index) | 107 | 100 |
| Rolling resistance properties (Index) | 99 | 100 |
| Wet grip performance (Index) | 100 | 100 |
| 100% Modulus (MPa) | 5.3 | 4 |
| Stress at break (MPa) | 16.5 | 10.5 |
| Elongation at break (%) | 350 | 260 |
| Hardness | 74 | 75 |

TABLE 2-continued

|  | Ex. 7 | Com. Ex. 4 |
|---|---|---|
| Post-heat aging properties | | |
| 100% Modulus (Index) | 62 | 61 |
| Stress at break (Index) | 79 | 66 |
| Elongation at break (Index) | 46 | 40 |
| Hardness (Index) | 92 | 90 |

From the results of Table 2, it can be seen that by compounding a metal salt of stearic acid, tensile properties, abrasion resistance and post-heat aging properties are improved.

TABLE 3

|  | Ex. 8 | Ex. 9 | Com. Ex. 5 |
|---|---|---|---|
| Composition (parts by weight) | | | |
| Natural rubber | 50 | 50 | 50 |
| Epoxidized natural rubber | 50 | 50 | 50 |
| Styrene butadiene rubber | — | — | — |
| Silica | 50 | 50 | 50 |
| Silane coupling agent | 5 | 5 | 5 |
| Calcium stearate | 5 | — | — |
| Barium stearate | — | 5 | — |
| Antioxidant | 1 | 1 | 1 |
| Stearic acid | 2 | 2 | 2 |
| Zinc oxide | 3 | 3 | 3 |
| Sulfur | 1.5 | 1.5 | 1.5 |
| Vulcanization accelerator TBBS | 1 | 1 | 1 |
| Vulcanization accelerator DPG | 0.5 | 0.5 | 0.5 |
| Evaluation results | | | |
| Processability (Index) | 121 | 118 | 100 |
| Abrasion resistance (Index) | 122 | 120 | 100 |
| Rolling resistance properties (Index) | 110 | 106 | 100 |
| Wet grip performance (Index) | 100 | 99 | 100 |
| 100% Modulus (MPa) | 3.5 | 3.8 | 4.5 |
| Stress at break (MPa) | 10.6 | 10.2 | 10.5 |
| Elongation at break (%) | 300 | 290 | 210 |
| Hardness | 75 | 77 | 80 |
| Post-heat aging properties | | | |
| 100% Modulus (Index) | 70 | 72 | 59 |
| Stress at break (Index) | 85 | 82 | 73 |
| Elongation at break (Index) | 60 | 55 | 50 |
| Hardness (Index) | 95 | 94 | 92 |

From the results of Table 3, it can be seen that by compounding a metal salt of stearic acid to a blend of epoxidized natural rubber and natural rubber, abrasion resistance and rolling resistance properties are improved significantly. Also, post-heat aging properties are improved and the range of improvement in 100% modulus is particularly large.

TABLE 4

|  | Ex. 10 | Com. Ex. 6 |
|---|---|---|
| Composition (parts by weight) | | |
| Natural rubber | — | — |
| Epoxidized natural rubber | 40 | 40 |
| Styrene butadiene rubber | 60 | 60 |
| Silica | 50 | 50 |
| Silane coupling agent | 5 | 5 |
| Calcium stearate | 5 | — |
| Barium stearate | — | — |
| Antioxidant | 1 | 1 |
| Stearic acid | 2 | 2 |
| Zinc oxide | 3 | 3 |
| Sulfur | 1.5 | 1.5 |
| Vulcanization accelerator TBBS | 1 | 1 |
| Vulcanization accelerator DPG | 0.5 | 0.5 |
| Evaluation results | | |
| Processability (Index) | 128 | 131 |
| Abrasion resistance (Index) | 113 | 100 |
| Rolling resistance properties (Index) | 101 | 100 |
| Wet grip performance (Index) | 101 | 100 |
| 100% Modulus (MPa) | 4.6 | 5.1 |
| Stress at break (MPa) | 12.1 | 8.8 |
| Elongation at break (%) | 330 | 200 |
| Hardness | 71 | 76 |
| Post-heat aging properties | | |
| 100% Modulus (Index) | 67 | 58 |
| Stress at break (Index) | 92 | 78 |
| Elongation at break (Index) | 71 | 45 |
| Hardness (Index) | 95 | 90 |

From the results of Table 4, it can be seen that by compounding a metal salt of stearic acid to a blend of epoxidized natural rubber and styrene butadiene rubber, abrasion resistance and post-heat aging properties are improved.

TABLE 5

|  | Ex. | | | | | | Com. Ex. | |
|---|---|---|---|---|---|---|---|---|
|  | 11 | 12 | 13 | 14 | 15 | 16 | 1 | 7 |
| Composition (parts by weight) | | | | | | | | |
| Natural rubber | 40 | 40 | 40 | 40 | 40 | 40 | 40 | 40 |
| Epoxidized natural rubber | 60 | 60 | 60 | 60 | 60 | 60 | — | 60 |
| Styrene butadiene rubber | — | — | — | — | — | — | 60 | — |
| Silica | 50 | 50 | 50 | 50 | 50 | 50 | 50 | 50 |
| Silane coupling agent | 5 | 5 | 5 | 5 | 5 | 5 | 5 | 5 |
| Aromatic oil | — | — | — | — | — | — | 10 | — |
| Vegetable oil | 10 | 10 | 10 | 10 | 10 | 10 | — | 10 |
| Calcium stearate | 5 | 5 | — | — | 5 | — | — | — |
| Barium stearate | — | — | 5 | 5 | — | — | — | — |
| Anionic surfactant 1 | 1 | — | 1 | — | — | 1 | — | — |
| Anionic surfactant 2 | — | 1 | — | 1 | — | — | — | — |

TABLE 5-continued

|  | Ex. | | | | | | Com. Ex. | |
| --- | --- | --- | --- | --- | --- | --- | --- | --- |
|  | 11 | 12 | 13 | 14 | 15 | 16 | 1 | 7 |
| Antioxidant | 1 | 1 | 1 | 1 | 1 | 1 | 1 | 1 |
| Stearic acid | 2 | 2 | 2 | 2 | 2 | 2 | 2 | 2 |
| Zinc oxide | 3 | 3 | 3 | 3 | 3 | 3 | 3 | 3 |
| Sulfur | 1.5 | 1.5 | 1.5 | 1.5 | 1.5 | 1.5 | 1.5 | 1.5 |
| Vulcanization accelerator TBBS | 1 | 1 | 1 | 1 | 1 | 1 | 1 | 1 |
| Vulcanization accelerator DPG | 0.5 | 0.5 | 0.5 | 0.5 | 0.5 | 0.5 | 0.5 | 0.5 |
| Evaluation results | | | | | | | | |
| Processability (Index) | 120 | 116 | 116 | 113 | 110 | 90 | 100 | 80 |
| Abrasion resistance (Index) | 105 | 104 | 104 | 102 | 84 | 95 | 100 | 80 |
| Rolling resistance properties (Index) | 105 | 105 | 106 | 105 | 105 | 105 | 100 | 103 |
| Wet grip performance (Index) | 106 | 105 | 105 | 104 | 104 | 103 | 100 | 105 |

From the results of Table 5, it can be seen that by compounding both a metal salt of stearic acid and an anionic surfactant to a composition containing epoxidized natural rubber and silica, processability and abrasion resistance are improved without decreasing rolling resistance properties and wet grip performance and balance of the properties is improved.

According to the first embodiment of the present invention, by compounding epoxidized natural rubber, silica, a silane coupling agent and an anionic surfactant, a rubber composition for a tire tread is provided, in which rolling resistance properties and wet grip performance are improved without decreasing processability and abrasion resistance.

Also, according to the second embodiment of the present invention, by compounding epoxidized natural rubber, silica, a silane coupling agent and a metal salt of stearic acid, a rubber composition for a tire tread is provided, in which abrasion resistance and heat resistance are improved without decreasing rolling resistance properties and wet grip performance.

Furthermore, according to the present invention, by compounding a combination of an anionic surfactant and a metal salt of stearic acid together with epoxidized natural rubber, silica and a silane coupling agent, a rubber composition for a tire tread is provided, in which processability, abrasion resistance, rolling resistance properties and wet grip performance are improved in a balanced manner.

What is claimed is:

1. A tire having a tread formed from a rubber composition comprising a vulcanized product of the following unreacted components:
   5 to 150 parts by weight of silica having nitrogen-adsorbing specific surface area of 100 to 300 m²/g based on 100 parts of a rubber component containing 5 to 100% by weight of an epoxidized natural rubber;
   1 to 20 parts by weight of a silane coupling agent based on 100 parts by weight of said silica; and
   0.1 to 20 parts by weight of an anionic surfactant based on 100 parts by weight of said silica,
   wherein said anionic surfactant is a polycarboxylate polymer surfactant,
   and said rubber composition further comprises 1 to 50 parts by weight of a vegetable-derived oil based on 100 parts by weight of said rubber component.

2. A tire having a tread formed from a rubber composition comprising a vulcanized product of the following unreacted components:
   5 to 150 parts by weight of silica having nitrogen-adsorbing specific surface area of 100 to 300 m²/g;
   1 to 10 parts by weight of a metal salt of stearic acid,
   based on 100 parts of a rubber component containing 5 to 100% by weight of an epoxidized natural rubber; and
   1 to 20 parts by weight of a silane coupling agent based on 100 parts by weight of said silica, wherein said metal salt of stearic acid is calcium stearate, calcium 12-hydroxystearate, barium stearate or barium 12-hydroxystearate, and
   said rubber composition further comprises 1 to 50 parts by weight of a vegetable-derived oil based on 100 parts by weight of said rubber component.

3. A tire having a tread formed from a rubber composition of claim 1, wherein said silane coupling agent satisfies the following formula:

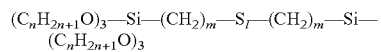

$(C_nH_{2n+1}O)_3—Si—(CH_2)_m—S_l—(CH_2)_m—Si—(C_nH_{2n+1}O)_3$ wherein l represents the number of sulfur atoms in the polysulfide part, n is an integer of 1 to 3, m is an integer of 1 to 4 and the average value of l is 2.1 to 3.5.

4. A tire having a tread formed from a rubber composition of claim 2, wherein said silane coupling agent satisfies the following formula:

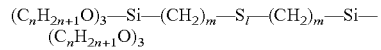

$(C_nH_{2n+1}O)_3—Si—(CH_2)_m—S_l—(CH_2)_m—Si—(C_nH_{2n+1}O)_3$ wherein l represents the number of sulfur atoms in the polysulfide part, n is an integer of 1 to 3, m is an integer of 1 to 4 and the average value of l is 2.1 to 3.5.

5. A tire having a tread formed from a rubber composition of claim 1, wherein the silica is present in an amount of at least 15 parts by weight and at most 120 parts by weight based on 100 parts of the rubber component, the rubber component contains 10 to 90% by weight of the epoxidized natural rubber, the silane coupling agent is present in amount of 2 to 15 parts by weight based on 100 parts by weight of the silica, and the anionic surfactant is present in an amount of 0.5 to 15 parts by weight based on 100 parts by weight of the silica.

6. A tire having a tread formed from a rubber composition of claim 2, wherein the silica is present in an amount of at least 15 parts by weight and at most 120 parts by weight based on 100 parts of the rubber component, the rubber component contains 10 to 90% by weight of the epoxidized natural rubber, the silane coupling agent is present in amount of 2 to 15 parts by weight based on 100 parts by weight of the silica, and the alkaline earth metal salt of stearic acid is present in an amount of 1.5 to 8 parts by weight based on 100 parts of the rubber component.

7. A tire having a tread formed from a rubber composition, wherein the rubber composition consists essentially of a vulcanized product of the following unreacted components:

5 to 150 parts by weight of silica having nitrogen-adsorbing specific surface area of 100 to 300 m$^2$/g based on 100 parts of a rubber component containing 5 to 100% by weight of an epoxidized natural rubber;

1 to 20 parts by weight of a silane coupling agent based on 100 parts by weight of said silica; and 0.1 to 20 parts by weight of an anionic surfactant based on 100 parts by weight of said silica, wherein said anionic surfactant is a polycarboxylate polymer surfactant, and said rubber composition further comprises 1 to 50 parts by weight of a vegetable-derived oil based on 100 parts by weight of said rubber component.

* * * * *